No. 727,299. PATENTED MAY 5, 1903.
L. E. COWEY.
WEIGHING APPARATUS.
APPLICATION FILED SEPT. 5, 1902.
NO MODEL. 2 SHEETS—SHEET 2.
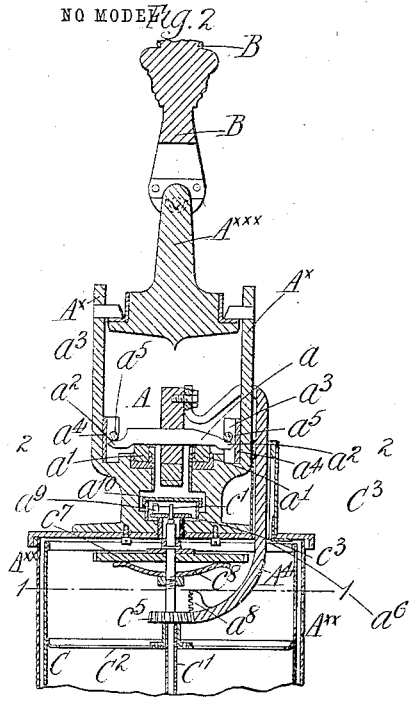
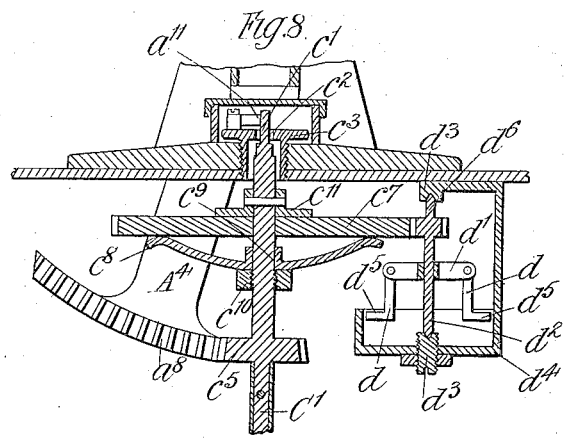
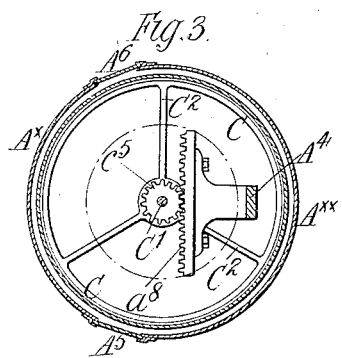
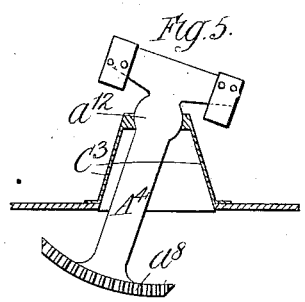
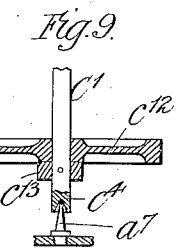
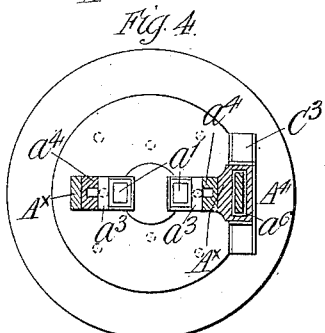
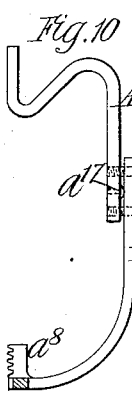
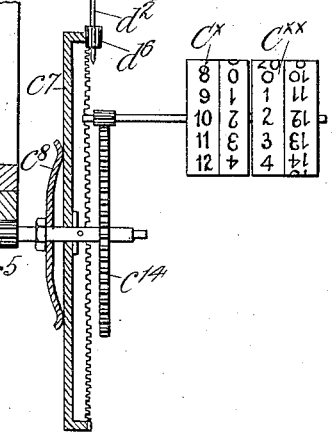
Witnesses:
Inventor
Leonard E. Cowey
By James L. Norris
Atty.

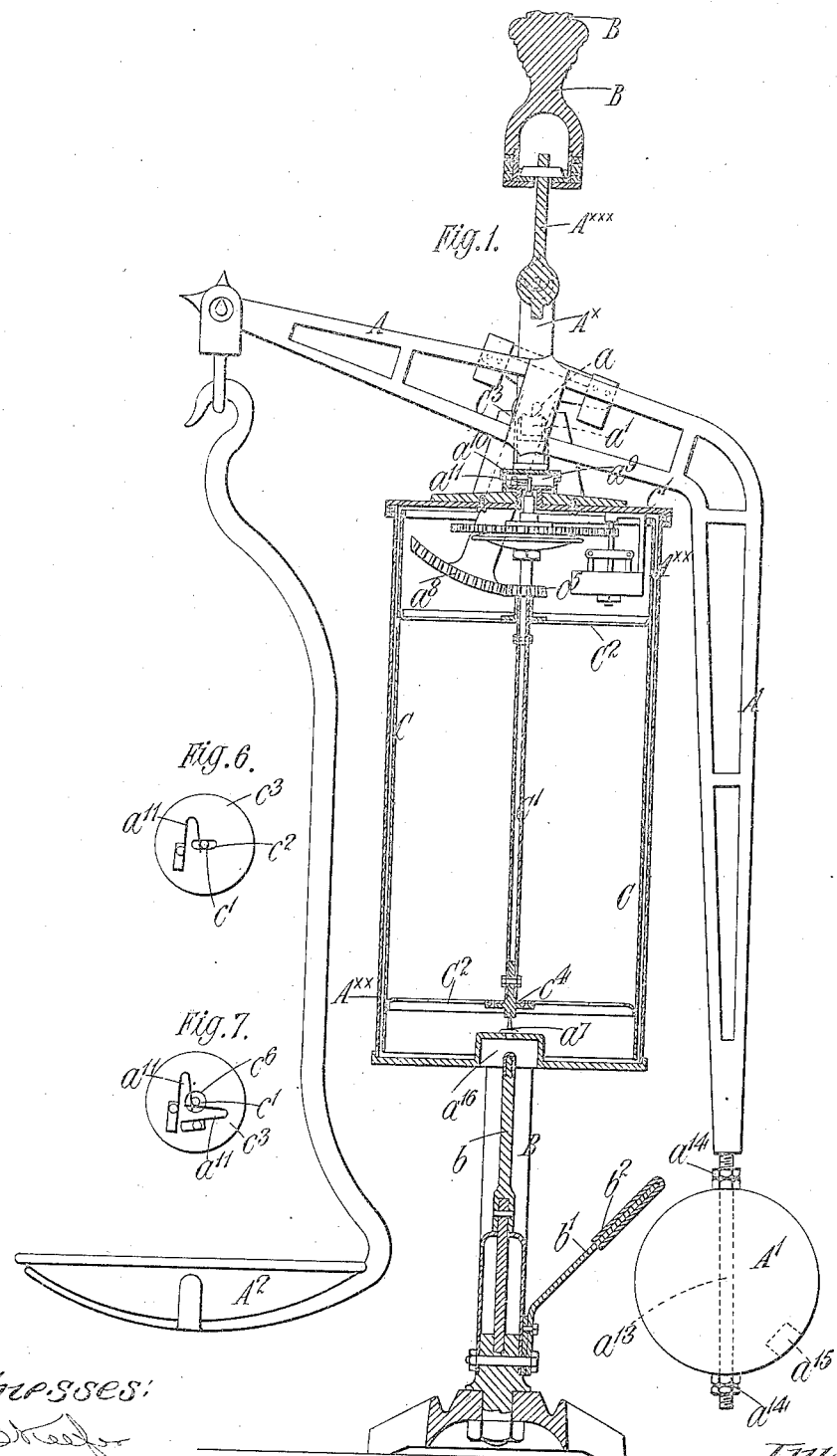

No. 727,299.

Patented May 5, 1903.

UNITED STATES PATENT OFFICE.

LEONARD EUGENE COWEY, OF LONDON, ENGLAND.

WEIGHING APPARATUS.

SPECIFICATION forming part of Letters Patent No. 727,299, dated May 5, 1903.

Application filed September 5, 1902. Serial No. 122,229. (No model.)

*To all whom it may concern:*

Be it known that I, LEONARD EUGENE COWEY, engineer, a subject of the King of Great Britain, residing at Clun House, Surrey Street, Strand, London, England, have invented certain new and useful Improvements Relating to Weighing Apparatus, of which the following is a specification.

This invention relates to weighing apparatus, and has reference particularly to that class of such apparatus in which a weight is acted upon and moved to a greater or less extent, according to the weight of the goods placed upon the goods-pan or weighing-receptacle, the apparatus being so constructed that the greater the downward movement of the goods-pan or weighing-receptacle under the weight of the goods placed upon it the smaller will be the leverage through which the goods act on the said weight.

The chief object of my invention is to so construct apparatus of this kind that it shall indicate in a simple and efficient manner on a suitable computing-scale both the weight and the monetary value of the goods being weighed at various rates or either the weight or the value of said goods.

According to my invention I provide a bent lever or beam having its fulcrum situated in a piece pivotally suspended from or otherwise suitably attached to the upper end of an appropriate pillar or support, said bent lever being adapted to move in a vertical plane. One end of said lever is weighted, and the other end has a goods-pan, weighing-receptacle, or the like pivotally suspended or otherwise connected therewith. The goods when placed in the goods-pan cause the weighted end of said lever to rise and the end bearing the goods-pan to descend to a greater or less extent in accordance with the weight of the goods. The movements of the said bent lever are transmitted by suitable mechanism, such as a segmental toothed rack and a pinion, to a shaft carrying a drum or drums bearing the signs for indicating the weight and the monetary value of the goods being weighed, said signs being exhibited contiguous to a scale suitably graduated to indicate the various rates at which the goods are being sold.

In order that my said invention may be clearly understood and readily carried into practice, I will describe the same more fully with reference to the accompanying drawings, in which—

Figure 1 is a vertical section of the complete apparatus. Fig. 2 is a vertical section of the upper part of the apparatus, this section being taken at right angles to that shown by Fig. 1. Fig. 3 is a horizontal section taken approximately on the line 1 1 of Fig. 2. Fig. 4 is a horizontal section taken approximately on the line 2 2 of Fig. 2. Fig. 5 is a face view of the segmental toothed rack. Figs. 6 and 7 are detail plan views showing means for taking up the "backlash" between the rack and pinion, as hereinafter described. Fig. 8 is a vertical section of a portion of the upper part of the apparatus, showing a brake device for causing the pivoted lever or beam of the apparatus to come to rest without unduly oscillating. Fig. 9 is a vertical section showing a modified form of the said brake device. Fig. 10 is a side elevation, and Fig. 11 a face view, of the aforesaid toothed rack provided with means for adjusting the same to correctly gear with the pinion. Fig. 12 is a detail view showing the computing-drums arranged in cyclometer form.

In all the figures like characters of reference indicate similar parts.

A is the bent lever or weighing-beam. A' is the weight adjustably mounted at one end of said lever, and $A^2$ the goods-pan hinged at the opposite end of said lever. B is the pillar or support to which said lever is pivoted.

C is the computing or indicating drum.

Referring more particularly to Figs. 1 to 4, the said bent lever or beam A has its fulcrum in a frame $A^x$, which is connected to the upper cover of a non-rotary casing $A^{xx}$, inclosing the drum C. This frame is pivotally suspended from a link $A^{xxx}$, which is in turn pivotally suspended from the upper end of the pillar or support B, the pivotal connections of the frame to the link and the link to the pillar being such that said frame and link are capable of freely rocking in planes at right angles to each other, so that the drum C and the casing $A^{xx}$ will always assume a truly vertical position regardless of inequalities of the surface upon which the apparatus stands, and as a consequence the scale or indications of said drum will always truly stand at zero when the apparatus is at rest and without goods in the goods-pan. The fulcrum of the bent lever comprises a knife-edge $a$, resting upon concave bearings $a'$ $a'$, of agate or other appropriate material, in the frame $A^\times$. The ends of said knife-edge $a$ are formed with pointed cylindrical extensions $a^2$ $a^2$, which enter vertical slots $a^3$ $a^3$ in brackets $a^4$ $a^4$, secured to the upright members of the frame $A^\times$, these slots being so arranged that the said cylindrical extensions of the knife-edge will be free to turn axially therein without participating in any substantial lateral movement. The pointed ends of the said extensions lie nearly in contact with the back wall of the said slots, so that the knife-edge will not be able to shift longitudinally, but will, nevertheless, be capable of turning axially with very little friction. A pin $a^5$ extends across each of the slots $a^3$ at a point just above the cylindrical ends of the knife-edge and prevents the latter from rising vertically to any undue extent. The knife-edge of the bent lever or beam is thus effectually prevented from becoming displaced in its bearings.

$C'$ is a vertical shaft carrying the drum $C$ by means of annular frames $C^2$ $C^2$, each of which is connected, respectively, to the drum and the shaft. The upper end of the shaft is reduced in diameter at $c'$ and projects through a slot $c^2$, formed in a cap $c^3$, screwing into the upper cover of the casing $A^{\times\times}$. The lower end of said shaft is formed with a concavity $c^4$ to rest upon a pointed support $a^7$, carried by the lower cover of the said casing. The shaft is thus free to easily turn and carry with it the drum $C$.

$A^4$ is a bent arm which is attached at its upper end to one side of the lever $A$ at a point above the fulcrum of the latter. This arm projects downwardly through a slot $a^6$ in the upper cover of the casing and enters the interior of the drum, where it is provided with the segmental toothed rack $a^8$, that gears with the pinion $c^5$ on the shaft $C'$ and actuates the same when the bent lever $A$ is rocked. Surrounding the said cap $c^3$ is a recess $a^9$ in the frame $A^\times$, said recess being closed by a screw-cap $a^{10}$. Within said recess is arranged a spring $a^{11}$, that keeps the upper end of the shaft $C'$ pressed in a direction to take up the backlash between the teeth of the rack $a^8$ and pinion $c^5$, the aforesaid slot $c^2$ in the cap $c^3$ permitting of this movement. In order to prevent the entrance of dust into the interior of the drum and its casing, I cover the said slot $a^6$ by a taper casing $C^3$, which at its upper end conforms to the shape of a circular boss $a^{12}$ on the arm $A^4$. This boss lies concentric with the fulcrum of the lever $A$, so that it freely turns in the casing when the lever $A$ is rocked; but it meets the said casing so closely as to form a dust-tight joint therewith.

Instead of employing a single spring $a^{11}$, as represented in Figs. 1, 2, and 6, I may employ two of such springs arranged at right angles to each other, as shown in Fig. 7, and in this case instead of providing a slot $c^2$ in the cap $c^3$ there would be a circular aperture $c^6$, Fig. 7.

The lower end of the lever $A$ is provided with the weight $A'$, which is adjustable on said lever. For this purpose the weight has a central hole in it through which a stem $a^{13}$ on the lever passes, said stem being screw-threaded to receive nuts $a^{14}$. By turning these nuts the position of the weight on said stem can be varied in accordance with requirements. The said weight is also provided with a cavity $a^{15}$ for receiving a plug of lead of the requisite weight for accurately adjusting the position of the said weight $A'$ when the apparatus is at rest.

The lower cover of the casing is formed with a cavity $a^{16}$, into which the upper end of a vertical rod $b$ projects for limiting the extent to which the drum and casing can move in a lateral direction.

$b'$ is a buffer comprising a spring-arm secured to the lower part of the standard $B$ and occupying such a position relatively to the weighted end of the arm $A$ that it will be struck thereby when the arm assumes its normal position after a weighing operation. The free end of said spring-arm is covered with india-rubber, felt, or other appropriate material $b^2$ for deadening any noise that might be produced by the striking of the said weighted end of the lever against the metal surface of said spring-arm.

The aforesaid drum $C$ is provided on its periphery with figures or signs representing the monetary values of the goods weighed and at its upper part is provided with a horizontal row of figures or signs representing the weight of the goods being weighed. These figures or signs may be arranged in any other appropriate manner. The casing is formed with two vertical slots $A^5$ $A^6$, Fig. 3, which are glazed and so arranged that one can be seen by the salesman and the other by the purchaser.

In order to insure that the lever $A$ shall be brought quickly to rest when effecting a weighing operation, so that the computing-drum shall not unduly oscillate and render the reading of its indications difficult, I provide a brake device which may be of the kind illustrated in Fig. 8. This device is arranged within the casing $A^{\times\times}$ and comprises a pair of arms $d$ $d$, freely suspended from a cross-bar $d'$, carried by a spindle $d^2$, which is pivoted in bearings $d^3$ $d^3$. Surrounding the lower ends of said suspended levers $d$ is a fixed ring $d^4$, which is concentric with the spindle $d^2$. The free ends of the arms $d$ are bent to form projections or shoes $d^5$, that normally lie close to but do not touch the interior surface of the ring $d^4$. Carried by the vertical shaft $C'$ is a toothed wheel $c^7$, which gears with a small toothed pinion $d^6$, carried by the spindle $d^2$. This toothed pinion $d^6$ is small as compared with the wheel $c^7$, and therefore when the shaft $C'$ is turned by the rack $a^8$ and pinion $c^5$ during a weighing operation it imparts a rapid rotation to the spindle $d^2$, with the result that the arms are caused by centrifugal force to fly outward and to bring their bent ends into contact with the inner surface of the ring $d^4$. A retarding action will thus be exerted on the movement of said spindle and the shaft $C'$, whereby the lever A, and consequently the computing-drum, will be quickly brought to rest in the position they assume in the weighing operation. In order to avoid straining the parts of the apparatus by thus suddenly bringing the said lever to rest, I prefer not to fix the said toothed wheel $c^7$ rigidly to the shaft $C'$, but to mount it loosely on said shaft and connect it with the latter by a friction-coupling, which in the example illustrated comprises a spring-disk $c^8$, carried by a square portion $c^9$ of the shaft, so as to be capable of turning therewith. This spring-disk is pressed against the under surface of the toothed wheel $c^7$ with the requisite degree of pressure by a nut $c^{10}$, screwed upon the shaft $C'$, said shaft being provided with a fixed collar $c^{11}$ above the toothed wheel, which collar serves as a point of resistance against which the wheel is pressed by the spring-disk. Therefore when the lever A is rocked suddenly the resulting shock is prevented from being transmitted to the other parts by reason of the wheel $c^7$ turning to some extent on the shaft $C'$.

Instead of using the device shown by Fig. 8 I may use the simplified arrangement shown by Fig. 9. In this case I loosely mount on the shaft $C'$ a fly-wheel $c^{12}$, resting upon a collar $c^{13}$ of said shaft. The friction existing between the wheel $c^{12}$ and collar $c^{13}$ is sufficient to prevent the shaft $C'$ from vibrating angularly when the weighted end of the lever A is coming to rest in weighing, and therefore insures that the said drum shall not unduly oscillate.

I wish it to be understood that I do not desire to confine myself to the above-described devices for bringing the lever A and the indicating-drum quickly to rest, as any other suitable contrivance may be used for such purpose.

For facilitating the adjustment of the toothed rack $a^8$ to properly gear with the pinion I prefer to make the bent arm carrying said rack in two parts, as shown in Figs. 10 and 11, one of which parts is furnished with a protuberance $a^{17}$, upon which the other part bears by the action of four screws $a^{18}$. The said protuberance is disposed centrally with regard to the said screws, so that by adjusting the two upper screws relatively to the two lower ones or the two screws on one side relatively to those on the other side I cause the lower portion of the rack to be slightly changed either in a vertical plane or in a horizontal plane, whereby the desired adjustment can be effected.

Although my weighing apparatus is particularly intended to be used for indicating the weight and monetary value of the goods weighed, it will be obvious that it can also be used for indicating either the weight or the monetary value of the goods by arranging the signs on the aforesaid indicating-drum accordingly. If the apparatus is only required to indicate the weight of the goods, I may make the indicating-drums very short and arrange a pair of them side by side and operate them like the drums of a cyclometer. Such an arrangement is illustrated by Fig. 12, wherein $C^\times$ $C^{\times\times}$ are the drums bearing numerals to indicate weights. These drums are mounted upon a horizontal shaft, although they might, if desired, be mounted on a vertical shaft. This shaft has a pinion gearing with a toothed wheel $c^{14}$, carried by a shaft which is equivalent to the shaft $C'$ of the arrangement already described. This shaft also has a pinion gearing with the curved rack on the arm forming part of the lever A. Said shaft is furnished with a loose crown-wheel gearing with a pinion carried by a shaft forming part of the brake device shown in Fig. 8. A spring-disk on said shaft keeps the said crown-wheel in gear with the pinion, as explained in connection with Fig. 8.

A double row of figures reading in reverse order is shown on each drum, so that the customer on one side of the drum and the shopman on the other side can both read the weight of the goods.

It will be obvious that when the bent lever A moves under the action of a greater or less weight of goods in the goods-pan the amplitude of its movements will not be in absolutely regular progression at all points of its path—that is to say, if for a certain weight of goods the angular movement of the bent lever be five degrees such movement will not be exactly twice as much or ten degrees for double the said weight, but something more or less, according to the manner in which the bent lever is disposed about its fulcrum. This irregularity of movement can be compensated for by marking off the divisions on the drum C according to the irregularity of the movements it performs. I do not, however, wish to confine myself to this particular method of effecting the compensation, as it is obvious that such method may be varied to suit requirements.

What I claim, and desire to secure by Letters Patent of the United States, is—

1. In weighing apparatus, the combination with a bent lever having a weight at one end and a weighing-receptacle at the other end, of a support in which said lever is fulcrumed, a rotary computing-drum suspended from said support, transverse pivots on said support suspended from a link for enabling said support to move in a plane coincident with that in which the bent lever moves, pivots on said link suspended from the standard of the apparatus for enabling said link to move in a plane at right angles to that in which the aforesaid drum-carrying support moves and means for actuating the said drum as the bent lever turns about its fulcrum, substantially as described.

2. In weighing apparatus, the combination with a bent lever having a weight at one end and a weighing-receptacle at the other end, of a support in which said lever is fulcrumed, a rotary computing-drum suspended from said support, transverse pivots on said support suspended from a link for enabling said support to move in a plane coincident with that in which the bent lever moves, pivots on said link suspended from the standard of the apparatus for enabling said link to move in a plane at right angles to that in which the aforesaid drum-carrying support moves, means for actuating the said drum as the bent lever turns about its fulcrum and a rotary brake device for preventing undue oscillation of the drum as it terminates its movement, substantially as described.

3. In weighing apparatus, the combination with a bent lever having a weight at one end and a goods-pan at the other end, of a support in which said lever is pivoted, a rotary computing-drum, a non-rotary slotted casing inclosing said drum and suspended from said support, a toothed rack carried by the bent lever, a shaft carrying said drum and turning in bearings in said casing, a pinion on said shaft gearing with said rack, a toothed wheel loosely mounted on said shaft and connected therewith by a friction device, a pinion gearing with the toothed wheel, a spindle parallel with said shaft and carrying said pinion, a cross-head on said spindle, bent arms pivotally suspended from said cross-head, and a fixed ring surrounding the bent ends of said arms and adapted to restrain the revolution of said spindle when the bent ends come against the inner surface of the ring by the action of centrifugal force, substantially as and for the purpose specified.

4. In weighing apparatus, the combination with the bent lever having a weight at one end and a goods-pan at the other end, of a support in which said lever is pivoted, a rotary computing-drum, a non-rotary slotted casing inclosing said drum and suspended from said support, a toothed rack carried by the bent lever, a vertical shaft carrying said drum and turning in bearings in said casing, a pinion on said shaft gearing with said rack, a toothed wheel loosely mounted on said shaft, a resilient disk turning with said shaft, and adapted to press against one face of the toothed wheel, means for adjusting the pressure of the disk on the toothed wheel, an abutment fixed to the shaft for the said toothed wheel to press against under the action of said resilient disk, a pinion gearing with said toothed wheel, a spindle carrying said pinion, arms pivotally supported on said spindle, and a fixed ring surrounding the free ends of said pivotal arms substantially as and for the purpose specified.

5. In weighing apparatus, the combination with the bent lever having a weight at one end and a goods-pan at the other end, of a frame pivotally supporting said lever to permit its turning in a vertical plane, pointed prolongations on the pivot of said lever, vertically-grooved brackets for the reception of said pointed prolongations, pins extending transversely through said slotted brackets at points immediately above said pointed prolongations, a link pivotally supporting said frame to permit the latter's turning in a vertical plane, a support in which the pivot of said link is suspended to permit its turning in a vertical plane at right angles to that of the bent lever, a rotary computing-drum carried by said frame, and means for actuating said drum as the bent lever turns about its pivot substantially as described.

6. In weighing apparatus, the combination with the bent lever having a weight at one end and a goods-pan at the other end, of a support in which said lever is pivoted, a rotary computing-drum, a non-rotary slotted casing inclosing said drum and suspended from said support, a toothed rack carried by said lever and projecting into said casing and drum through a slot in the casing, a shaft supported in bearings in said casing and carrying said drum, a pinion on said shaft gearing with said rack, a circular boss on said rack concentric with the pivot of the bent lever, and a casing covering said slot in the non-rotary casing and conforming at its upper end to the shape of the circular boss of the rack substantially as and for the purpose specified.

7. In weighing apparatus, the combination with the bent lever having a weight at one end and a goods-pan at the other end, of a support in which said lever is pivoted, a rotary computing-drum, a non-rotary slotted casing inclosing said drum and suspended from said support, a toothed rack carried by said lever, a vertical shaft carrying said drum, bearings in said casing supporting said shaft, the upper bearing being loose, a pinion on said shaft gearing with said rack, and a spring device located near the upper end of said shaft and normally tending to keep it pressed in a direction to take up the backlash between the rack and pinion, substantially as described.

In testimony whereof I have hereunto set my hand, in presence of two subscribing witnesses, this 13th day of August, 1902.

LEONARD EUGENE COWEY.

Witnesses:
EDWARD W. JOHNSON,
GEORGE ISAAC BRIDGES.